United States Patent [19]

Serizawa et al.

[11] Patent Number: 5,262,461
[45] Date of Patent: Nov. 16, 1993

[54] POLYARYLENE SULFIDE RESIN COMPOSITION AND METHOD FOR PREPARING THE SAME

[75] Inventors: Hajime Serizawa, Mishima; Masaru Kubota, Fujinomiya; Hiroyuki Sano; Katsumi Uoda, both of Fuji, all of Japan

[73] Assignee: Polyplastics Co., Ltd., Osaka, Japan

[21] Appl. No.: 856,148

[22] PCT Filed: Aug. 15, 1991

[86] PCT No.: PCT/JP91/01090
§ 371 Date: Mar. 30, 1992
§ 102(e) Date: Mar. 30, 1992

[87] PCT Pub. No.: WO92/03508
PCT Pub. Date: Mar. 5, 1992

[30] Foreign Application Priority Data

Aug. 21, 1990 [JP] Japan .................................. 2-220774

[51] Int. Cl.$^5$ .............................................. C08K 5/54
[52] U.S. Cl. ........................................ 524/262; 524/386; 524/391; 524/379; 524/383; 524/609; 524/606; 525/420; 525/537; 525/540
[58] Field of Search ............... 524/262, 386, 391, 606, 524/609, 379, 383, 389; 525/420, 537

[56] References Cited

U.S. PATENT DOCUMENTS

| | | | |
|---|---|---|---|
| 5,070,127 | 12/1991 | Auerbach | 524/262 |
| 5,070,151 | 12/1991 | Mizuno et al. | 525/396 |
| 5,149,731 | 9/1992 | Uota et al. | 524/265 |

*Primary Examiner*—John C. Bleutge
*Assistant Examiner*—Mark Sweet
*Attorney, Agent, or Firm*—Depaoli & O'Brien

[57] ABSTRACT

A polyarylene sulfide resin composition useful for molding articles is obtained by mixing and melt kneading a polyarylene sulfide resin, a polyamide resin, a silane compound and either water or an alcohol having a boiling point of at least 100° C.

20 Claims, No Drawings

POLYARYLENE SULFIDE RESIN COMPOSITION AND METHOD FOR PREPARING THE SAME

FIELD OF THE INVENTION

The present invention relates to an improved polyarylene sulfide resin composition and a method of preparing the same.

More particularly, the present invention relates to a polyarylene sulfide resin composition having excellent impact resistance and heat resistance and which is produced by blending specific amounts of alkoxysilane compound, water and the like to a resin component comprising a polyarylene sulfide resin and a polyamide resin, and heat melting and kneading the resultant blend, and to the method of preparing same.

BACKGROUND OF THE INVENTION

Recently, a thermoplastic resin having high heat and chemical resistance and excellent flame retardance has been demanded as the material of construction for the components of electrical or electronic appliances, automobile devices or chemical instruments.

Polyarylene sulfide resin, represented by polyphenylene sulfide, is one of the resins satisfying this demand and is inexpensive relative to the excellent properties thereof, such that the demand for polyarylene sulfide resin has increased. However, polyarylene sulfide resin has critical disadvantages in that it is inferior to other engineering plastics such as nylon, polycarbonate, polyacetal, polybutylene terephthalate, and the like, because polyarylene sulfide resin has poor ductility and is therefore brittle.

As a means for overcoming these problems, it is known that blending a fibrous reinforcement material such as glass fiber or carbon fiber and other fillers improves the properties of polyarylene sulfide resin such as strength, rigidity, toughness, heat resistance and the like. However, even by blending such reinforcement materials with polyarylene sulfide resin, the resin still has poor toughness compared with the engineering plastics described above, and the application polyarylene sulfide resin for a great number of uses may be limited in some cases, even though the resin has excellent chemical resistance, heat resistance and nonflammability.

The present inventors have made thorough investigations of polyarylene sulfide resin compositions having high toughness and impact resistance and the method for preparing the same, and examined a reactive substance capable of reacting with both polyarylene sulfide resin and polyamide resin. Consequently, it has been found that a silane compound having a alkoxysilane group within the molecule thereof provides an improvement in impact strength of the blend. The inventors have applied for patents as Japanese Patent Laid-open Nos. 320140/1989, 44140/1990 and 110839/1990 on such composition and the method for preparing same. The improved blend realizes good toughness and impact strength, but the physical properties thereof may vary occasionally. Accordingly improvement has been desired.

SUMMARY OF THE INVENTION

The present inventors have found that to stably produce a polyarylene sulfide resin composition with still more improved toughness and impact strength, the presence of water and the like is influential. Accordingly blending an alkoxysilane compound and a specific amount of water or alcohols with a boiling point of 100° C. or more, with a blend of polyarylene sulfide resin and polyamide resin, and processing and kneading the resultant blend at a specific temperature for a specific period of time, a molding material with remarkably high toughness and utility can be produced in a stable fashion. The present invention therefore relates to a method of preparing a polyarylene sulfide resin composition, comprising mixing (C) 0.01 to 5 parts by weight of at least one silane compound selected from the group consisting of vinylalkoxysilane, epoxyalkoxysilane, aminoalkoxysilane, mercaptoalkoxysilane and allylalkoxysilane, and (D) 0.03 to 5 moles per mole of the component (C) of water, or at least one alcohol selected from alcohols with a boiling point of 100° C. or more, or a mixture thereof, with 100 parts by weight of a resin component comprising (A) 97 to 20 parts by weight of a polyarylene sulfide resin and (B) 3 to 80 parts by weight of a polyamide resin, and processing the resultant mixture by heat melting and kneading in the presence of at least the above four components for 30 seconds or more, and relates to a resin composition produced according to the method for preparing the same.

DETAILED DESCRIPTION OF THE INVENTION

The polyarylene sulfide resin as the component (A) to be used in the present invention is constituted mainly of repeating units -(Ar-S)- (provided that Ar is arylene group).

As the arylene group, there can be used p-phenylene group, m-phenylene group, o-phenylene group, substituted phenylene groups (provided that the substituent is an alkyl group, preferably an alkyl group of $C_1$ to $C_5$ or a phenylene group), p,p'-diphenylene sulfone group, p,p'-biphenylene group, p,p'-diphenylene ether group, p,p'-diphenylene carbonyl group, naphthalene group and the like.

In this invention, there can be used a polymer employing an identical repeating unit among the arylene sulfide group constituted of the arylene groups described above, namely a homopolymer. A copolymer containing different repeating units may be preferable in some cases.

As the homopolymer, a substantially linear one with p-phenylene sulfide group as the repeating unit and in which p-phenylene group is employed as the arylene group, is perferably used.

As the copolymer, there can be used a combination of two or more different arylene sulfide groups comprising the arylene group described above, but in particular a combination of p-phenylene sulfide groups in the main and containing m-phenylene sulfide groups is preferably used. Among copolymers, substantially linear ones containing 60 mole % or more, more preferably 70 mole % or more of p-phenylene sulfide groups, are suitable from the standpoint of physical properties such as heat resistance, moldability and mechanical properties.

Further, copolymers containing 5 to 40 mole %, in particular 10 to 25 mole % of m-phenylene sulfide group are preferable as the copolymer.

In this invention, those copolymers containing component-repeating units in block form (for example, those described in Japanese Patent Laid-open No. 14228/1986) rather than in a random form can be used favorably, because of good processability and excellent heat resistance and mechanical properties thereof.

The polyarylene sulfide resin as component (A) to be used in the present invention, there can be employed a polymer with the molding processability improved by crosslinking the polymer described above oxidatively or thermally whereby its melt viscosity is increased. There can also be used a polymer having a substantially linear structure, obtained by polycondensation of principally bifunctional monomers. In many cases, the latter polymer having a substantially linear structure is superior with respect to the physical properties of the molded articles thus obtained.

As the polyarylene sulfide resin of the present invention, there can preferably be used, other than the polymers described above, a resin prepared by blending with the linear polymer described above a crosslinked polyarylene sulfide resin prepared by using and polymerizing monomers with three or more functional groups in combination as a part of the monomer.

The polyamide resin useful as component (B) of the present invention includes various known polyamide resins. These include for example, polyamide resins obtained by polycondensing dicarboxylic acid such as oxalic acid, adipic acid, suberic acid, sebacic acid, terephthalic acid, isophthalic acid, and 1,4-cyclohexyl dicarboxylic acid, with diamine such as ethylene diamine, pentamethylene diamine, hexamethylene diamine, decamethylene diamine, 1,4-cyclohexyl diamine and m-xylylene diamine; polyamide resins obtained by polymerizing cyclic lactam such as caprolactam and lauric lactam; polyamide resins obtained by copolymerizing cyclic lactam and the salts of dicarboxylic acid and diamine or the like. Among these polyamide resins, nylon 6, nylon 66, nylon 12, the copolymers thereof and the like are illustrated preferably.

Also, polyamide elastomer resins can be used as the polyamide resin as the component (B). Polyamide elastomer resins are polyamide block copolymers having a bending modulus of 10,000 kgf/cm$^2$ or less (relative humidity of 50% and 23° C.) composed of polyamide hard segments bonded with other soft segments. As the soft segments of such elastomer, polyalkylene oxide (the alkylene group having 2 to 6 carbon atoms) is a representative example. A great number of reports have been made about the synthesis of such polyamide elastomers, and the synthesis is commonly carried out in two stages i.e., the production of nylon oligomer and the polymerization thereof by esterification. The polyamide component as the hard segment herein includes the polyamides such as polyamide 6, polyamide 66, polyamide 6,12, polyamide 11, polyamide 12 and the like; the polyether component as the soft segment includes polyoxyethylene glycol, polyoxypropylene glycol, polyoxytetramethylene glycol and the like.

Furthermore, the polyamide resin as the component (B) is not limited to one type, as two or more types may be used in combination in order to control the physical properties.

In accordance with the present invention, the mixing amount of polyamide resin (B) is 3 to 80% by weight to the total amount of the components (A) and (B). If the component (B) is much less, a lower effect is obtained with respect to toughness improvement; if too much, the advantage of the polyarylene sulfide resin (A) is deteriorated.

The present invention is characterized by adding and mixing the alkoxysilane compound (C) along with the above resin components.

The alkoxysilane (C) to be used in the present invention is selected from one or more of vinylalkoxysilane, epoxyalkoxysilane, aminoalkoxysilane, mercaptoalkoxysilane, allylalkoxysilane, etc.

Examples of vinylalkoxysilane include vinyltriethoxysilane, vinyltrimethoxysilane, and vinyltris($\beta$-methoxyethoxy)silane, etc.

Examples of epoxyalkoxysilane include $\gamma$-glycidoxypropyltrimethoxysilane, $\beta$-(3,4-epoxycyclohexyl)ethyltrimethoxysilane, and $\gamma$-glycidoxypropyltriethoxysilane, etc.

Examples of aminoalkoxysilane include $\gamma$-aminopropyltrimethoxysilane, $\gamma$-aminopropyltriethoxysilane, $\gamma$-aminopropyldimethoxysilane, $\gamma$-aminopropylmethyldiethoxysilane, N-($\beta$-aminoethyl)-$\gamma$-aminopropyltrimethoxysilane, N-phenyl-$\gamma$-aminopropyltrimethoxysilane, etc.

Examples of mercaptoalkoxysilane include $\gamma$-mercaptopropyltrimethoxysilane, $\gamma$-mercaptopropyltriethoxysilane, etc.

Examples of allylalkoxysilane include $\gamma$-diallylaminopropyltrimethoxysilane, $\gamma$-allylaminopropyltrimethoxysilane, $\gamma$-allylthiopropylltrimethoxysilane, etc..

The amount of the alkoxysilane compound to be used as the component (C) is 0.01 to 5 parts by weight, preferably 0.1 to 3 parts by weight to 100 parts by weight of the total amount of polyarylene sulfide resin [component (A)] and polyamide resin [component (B)].

The amount of alkoxysilane compound to be added varies depending on the type thereof and the use of the objective compositions. If too little is used, a lower effect is obtained on toughness improvement; if too much, the melt viscosity increased excessively causing disadvantages during mold processing.

The present invention is characterized in that a controlled amount of water or alcohols with a boiling point of 100° C. or more, as component (D), are added along with components (A), (B) and (C), and the mixture heat melted and kneaded. Unfavorably, alcohols with a boiling point of 100° C. or less vaporize during the heat melting process, so their effect may not be sufficiently exhibited. The alcohols with a boiling point of 100° C. or more belonging to component (D) to be used in the present invention, include for example isobutyl alcohol, isopentyl alcohol, cyclohexanol, benzyl alcohol, ethylene glycol, propylene glycol, butanediol, pentanediol, neopentyl glycol, hexanediol, octanediol, decanediol, glycerine, diethylene glycol, triethylene glycol, pentaerythritol, clohexanedimethanol, hydroquinone, N-ethyl-2,2'-iminodiethanol, N-butyl-2,2'-iminodiethanol, 2-butyl 1,4-diol, 2-butene 1,4-diol, bisphenol A, 2,2'-bis(4-hydroxyethoxyphenyl)propane, xylene glycol, etc..

It is required to regulate the amount of the component (D) to be used within a range of 0.03 to 5 mole, preferably 0.03 to 3 mole, per one mole of the component (C). The amount of the component (D) to be added varies, depending on the type, the preparative method of the compositions and the objective physical properties of the compositions. Problems may arise concerning the stable production of compositions with good toughness if the amount of component (D) added is too small; whereas disadvantages may be caused by the occurrence of bleedout on the surface of molded articles if the amount is too much. Further, the preferable amount of the component (D) to be used will vary depending on the mode as to how the component is added and blended. In other words, in the case in which component (D) is preliminarily added to the alkoxysilane compound (C) and then kneaded with other components, a relatively small amount is generally preferable within the range described above. In the case in which component (D) is added and blended in the state of being adsorbed onto other components (or being humidified), a relatively greater amount may be appropriate. Regarding the method as to how to add component (D), component (D) may be added to any one of the components (A), (B), and (C), and the component (E) in some cases. It is particularly preferable to preliminarily add component (D) to the alkoxysilane compound (C). Also, in case of using alcohols with a boiling point of 100° C. or more as the component (D), it has been observed that alcohols with two or more hydroxyl groups within the individual molecule rather than those with one hydroxyl group within the individual molecules tend to exert the beneficial effects using a smaller amount thereof.

Other than the components described above, the composition of the present invention can be blended with an inorganic filler, as the component (E). Preferably, such filler (E) is blended in order to produce molded articles having excellent properties such as mechanical strength, heat resistance, dimensional stability, electrical properties and the like. Fibrous, powdery and flaky fillers are used as the filler (E), depending on the object.

As fibrous fillers, there are included inorganic fibrous materials such as glass fiber, asbestos fiber, carbon fiber, silica fiber, silica/alumina fiber, zirconia fiber, boron nitride fiber, silicon nitride fiber, boron fiber and potassium titanate fiber, and fibers of metals including stainless steel, aluminum, titanium, copper or brass. Particularly representative fibrous fillers are glass fiber or carbon fiber. Further, organic fibrous materials with high melting points may also be used, including polyamides, fluororesins, alkali resins and the like.

Alternatively, the powdery filler includes carbon black, silica, quartz powder, glass bead, glass powder, silicates such as calcium silicate, aluminum silicate, kaolin, talc, clay, diastomaceous earth and wollastonite, metal oxides such as iron oxide, titanium oxide and alumina; metal carbonates such as calcium carbonate and magnesium carbonate; metal sulfates such as calcium sulfate and barium sulfate; silicon carbide, silicon nitride, boron nitride and various metal powders.

The flaky filler includes mica, glass flake and various metal foils.

These inorganic fillers may be used alone or in combination of two or more thereof. The concurrent use of a fibrous filler, in particular glass or carbon fiber, with a powdery or flaky filler is preferable as a combination with respect to the provision of mechanical strength, dimensional precision and electrical properties.

The amount of inorganic filler to be added is 400 parts by weight or less per 100 parts by weight of the total amount of the resin components (A) and (B). If the amount of filler exceeds this, the processability during molding and toughness are deteriorated unfavorably. It is specifically preferable to add 250 parts by weight or less of filler per 100 parts by weight of (A) and (B).

To the composition of the present invention herein can be added as a supplement a small amount of other thermoplastic resins within a range without damaging the objects of the present invention, in addition to a polyarylene sulfide resin and a polyamide resin. The thermoplastic resins herein used may be any thermoplastic resin stable at a high temperature approximately of the melting temperature of a polyarylene sulfide resin.

For example, there are illustrated olefin polymer, aromatic polyester polymer comprising aromatic dicarboxylic acid such as polyethylene terephthalate, polybutylene terephthalate, complete aromatic polyester, etc. and diol or oxycarboxylic acid, polycarbonate, ABS, polyphenylene oxide, polyalkylacrylate, polyacetal, polysulfone, polyether sulfone, polyether imide, polyether ketone, fluororesin, etc.. Furthermore, these thermoplastic resins may be used in combination of two or more thereof. Among them, ethylene copolymer or its graft copolymer as polyolefin polymer, for example, copolymer of ethylene and $\alpha,\beta$-unsaturated fatty acid or alkyl ester or glycidyl ester thereof, and the graft copolymer produced by further grafting vinyl polymer with the copolymer, and the like, are specifically preferable as an auxiliary component.

The composition of the present invention can be prepared by known methods, but it is required to mix and knead simultaneously at least the four components (A), (B), (C) and (D) at the heat melted state thereof for 30 seconds or more. Generally, the component (D) is preliminarily added to the component (C), and the resulting mixture is blended with the components (A) and (B), and (E) if necessary, which is then preliminarily mixed uniformly with a mixer such as a tumbler or a Henschel mixer. The resultant mixture is then fed to a uniaxial or biaxial extruder for heat melting and kneading, to be prepared as pellets. The components (A), (B), (C) and (D) may be directly mixed, without preliminarily adding the component (D) to the component (C); or the component (D) may be preliminarily adsorbed onto the component (A) or (B), which is then mixed with the component (C). In this latter case, the tendency is that a greater amount of component (D) is needed, compared with the amount of component (D) in case in which component (D) is preliminarily added to component (C). Furthermore, the form of the components (A) and (B) may be pellets, but a part of the component (A) or (B) or its entirety is preferably made into powder. Preferably, a mixture of (C) and (D) is added to the part of the powder, or (C) and (D) are added separately to the part of the powder. The resultant mixture is uniformly mixed once with a blender, which is then uniformly mixed with the remaining components for the process of heat melting and kneading. Also, the component (E) may be added during or after the process of heat melting and kneading.

The temperature for the process of heat melting and kneading is higher by 5° C. to 100° C. than the melting point of the resin component, and is preferably higher by 10° C. to 60° C. than the resin melting point. At temperatures too high, the degradation of the resin and abnormal reactions may unfavorably result. Further, the period of time for heat melting and kneading varies depending on the temperature of the processing and the types and amounts of components (C) and (D) added. The time for heat melting and kneading is at least 30 seconds or more and 15 minutes or less, and preferably 1 to 10 minutes.

The detailed mechanism of the actions and effects between the alkoxysilane compound component (C) and component (D) of the present invention has not yet thoroughly elucidated, but it is believed that the polyarylene sulfide molecule and polyamide molecule are efficiently bonded together via the presence of component (D), to improve the compatibility between the components (A) and (B). This is confirmed by electron microscopic observation of the cross section of a molded article from the composition. That is, in case of components (A) and (B) solely, the dispersion components are present as coarse particles (for example, 10 μ or less). According to the method of the present invention, it is observed that the dispersion components are in dispersion as extremely uniform and fine particles (at most 3μ or less, and generally 1μ or less).

Furthermore, there may be added antioxidants, heat stabilizers, lubricants, nucleating agents, ultraviolet absorbers, colorants, mold release agents, and other common additives, within a range without deviating from the objects of the present invention.

These additives may be added and blended, simultaneously with or separately from the process of heat melting and kneading. Effects of the Invention The polyarylene sulfide resin composition of the present invention has the following effects;
(1) Molded articles with good mechanical properties such as tensile elongation, impact strength, etc. are produced in a stable fashion;
(2) The balance between the heat resistance and the mechanical properties is maintained at a higher degree.

EXAMPLES

The present invention will now be explained more concretely in the following examples, but the present invention is not intended to be limited solely to the embodiments shown therein.

EXAMPLES 1 TO 3, COMPARATIVE EXAMPLES 1 TO 3

Water was added to γ-aminopropyltriethoxysilane at the ratios shown in Table 1, with subsequent blending of polyphenylene sulfide polymer (a melting point of 285° C., a melt viscosity of 500 poise as measured at 310° C. and a shear rate of 1200 sec$^{-1}$), and nylon 66, and in some cases glass fiber (chopped strand of 10 μm diameter and 3 mm in length), at the ratios shown in Table 1, which were then preliminarily mixed together for five minutes. The resultant mixture was heat melted and kneaded in an extruder at 310° C. (residence time of about 3 minutes) to produce pellets of polyphenylene sulfide resin composition.

Then, 10 ASTM test pieces were individually molded at the conditions of a cylinder temperature of 310° C. and a mold temperature of 150° C., to carry out tensile test, impact test, and thermal deformation test.

The results are shown in Table 1. Concerning tensile elongation and Izod impact strength, the maximum and minimum and mean values of samples are shown in Table 1. (Change in the amount of the component (C).)

EXAMPLES 4 TO 7, COMPARATIVE EXAMPLES 4 TO 7

As in the above Examples and Comparative Examples, using polyphenylene sulfide polymer and nylon 66 at the blend ratios shown in Table 2 (change in (A): (B)), tests were performed as in Examples 2 and 3, and Comparative Examples 2 and 3. The results are shown in Table 2.

EXAMPLES 8 TO 11

As in the above Examples and Comparative Examples, using polyphenylene sulfide polymer and nylon 66 at the blend ratios shown in Table 3 (change in the amount of (D)), tests were performed as in Examples 2 and 3, and Comparative Examples 2 and 3. The results are shown in Table 3.

EXAMPLES 12 TO 15, COMPARATIVE EXAMPLES 8 TO 11

Replacing the nylon 66 in the Examples 2 and 3 and Comparative Examples 2 and 3 with nylon 6 or nylon 12, tests were performed at the blend ratios shown in Table 4, as in Examples 2 and 3, and Comparative Examples 2 and 3. The results are shown in Table 4.

EXAMPLES 16 TO 19, COMPARATIVE EXAMPLES 12 TO 15

Replacing the γ-aminopropyltriethoxysilane in Example 2 and Comparative Example 2 with γ-glycidoxypropyltrimethoxysilane, γ-mercaptopropyltrimethoxysilane, vinyltrimethoxysilane, and γ-diallylaminopropyltrimethoxysilane, tests were performed at the blend ratios shown in Table 5, as in Example 2 and Comparative Example 2. The results are shown in Table 5.

EXAMPLES 20 TO 23

Replacing the water in Example 2 and Comparative Example 2 with benzyl alcohol, ethylene glycol, butanediol and glycerin, tests were performed at the blend ratios shown in Table 6, as in Example 2 and Comparative Example 2. The results are shown in Table 6.

EXAMPLES 24 AND 25

Water was preliminarily added to or was made to humidify the powdery polyphenylene sulfide resin or nylon 66 described above at the ratios shown in Table 7, and blending was effected along with other components at the ratios shown in Table 7, which was then preliminarily mixed together with a Henschel mixer for five minutes. After the preliminary mixing, tests were performed as in Example 2. The results are shown in Table 7.

TABLE 1

|  | Comp. Ex. 1 | Ex. 1 | Comp. Ex. 2 | Ex. 2 | Comp. Ex. 3 | Ex. 3 |
| --- | --- | --- | --- | --- | --- | --- |
| Blend ratio |  |  |  |  |  |  |
| (A) polyphenylene sulfide resin (pts. by wt.) | 60 | 60 | 60 | 60 | 60 | 60 |
| (B) nylon 66 resin (pts. by wt.) | 40 | 40 | 40 | 40 | 40 | 40 |
| (C) γ-aminopropyltriethoxysilane (pts. by wt.) | 0.5 | 0.5 | 2.0 | 2.0 | 2.0 | 2.0 |
| (D) water (in mole per one mole of (C)) | — | 0.05 | — | 0.05 | — | 0.05 |
| (E) glass fiber (pts. by wt) | — | — | — | — | 67 | 67 |
| Physical properties of compositions |  |  |  |  |  |  |

TABLE 1-continued

| | | Comp. Ex. 1 | Ex. 1 | Comp. Ex. 2 | Ex. 2 | Comp. Ex. 3 | Ex. 3 |
|---|---|---|---|---|---|---|---|
| tensile strength (kgf/cm$^2$) | | 778 | 782 | 845 | 852 | 2340 | 2350 |
| tensile elongation | mean | 30 | 34 | 48 | 52 | 5.7 | 6.1 |
| (%) | maximum | 36 | 38 | 57 | 58 | 6.4 | 6.6 |
| | minimum | 18 | 31 | 21 | 46 | 3.6 | 5.7 |
| Izod impact strength notched | mean | 3.4 | 3.6 | 5.0 | 5.3 | 12.4 | 12.9 |
| (kgcm/cm) | maximum | 3.8 | 3.9 | 5.7 | 5.8 | 13.9 | 14.0 |
| | minimum | 2.5 | 3.3 | 2.7 | 4.8 | 7.8 | 12.6 |
| Izod impact strength unnotched | mean | 48 | 53 | 80 | 85 | 52 | 57 |
| (kgcm/cm) | maximum | 55 | 57 | 94 | 95 | 59 | 61 |
| | minimum | 30 | 47 | 37 | 77 | 34 | 54 |
| thermal deformation temperature [°C.], 18.6 kg load | | 110 | 110 | 108 | 108 | 254 | 254 |

TABLE 2

| | | Comp. Ex. 4 | Ex. 4 | Comp. Ex. 5 | Ex. 5 | Comp. Ex. 6 | Ex. 6 | Comp. Ex. 7 | Ex. 7 |
|---|---|---|---|---|---|---|---|---|---|
| Blend ratio | | | | | | | | | |
| (A) polyphenylene sulfide resin (pts. by wt.) | | 80 | 80 | 40 | 40 | 80 | 80 | 40 | 40 |
| (B) nylon 66 resin (pts. by wt.) | | 20 | 20 | 60 | 60 | 20 | 20 | 60 | 60 |
| (C) γ-aminopropyltriethoxysilane (pts. by wt.) | | 2.0 | 2.0 | 2.0 | 2.0 | 2.0 | 2.0 | 2.0 | 2.0 |
| (D) water (in mole per one mole of (C)) | | — | 0.05 | — | 0.05 | — | 0.05 | — | 0.05 |
| (E) glass fiber (pts. by wt) | | — | — | — | — | 67 | 67 | 67 | 67 |
| Physical properties of compositions | | | | | | | | | |
| tensile strength (kgf/cm$^2$) | | 718 | 722 | 835 | 842 | 2010 | 2030 | 2335 | 2350 |
| tensile elongation | mean | 32 | 35 | 60 | 64 | 4.0 | 4.2 | 6.9 | 7.2 |
| (%) | maximum | 37 | 39 | 69 | 70 | 4.7 | 4.8 | 8.0 | 8.1 |
| | minimum | 21 | 32 | 32 | 57 | 2.4 | 3.8 | 3.1 | 6.5 |
| Izod impact strength notched | mean | 4.0 | 4.3 | 5.6 | 5.9 | 11.0 | 11.2 | 12.7 | 13.2 |
| (kgcm/cm) | maximum | 4.6 | 4.7 | 6.5 | 6.6 | 12.2 | 12.3 | 14.1 | 14.3 |
| | minimum | 2.5 | 3.9 | 3.0 | 5.1 | 6.8 | 10.5 | 8.2 | 12.0 |
| Izod impact strength unnotched | mean | 66 | 69 | 95 | 98 | 41 | 45 | 58 | 61 |
| (kgcm/cm) | maximum | 77 | 78 | 110 | 114 | 47 | 49 | 65 | 66 |
| | minimum | 35 | 62 | 47 | 88 | 31 | 42 | 39 | 57 |
| thermal deformation temperature [°C.], 18.6 kg load | | 114 | 114 | 95 | 95 | 256 | 256 | 251 | 251 |

TABLE 3

| | | Comp. Ex. 2 | Ex. 2 | Ex. 8 | Ex. 9 | Ex. 10 | Comp. Ex. 3 | Ex. 11 |
|---|---|---|---|---|---|---|---|---|
| Blend ratio | | | | | | | | |
| (A) polyphenylene sulfide resin (pts. by wt.) | | 60 | 60 | 60 | 60 | 60 | 60 | 60 |
| (B) nylon 66 resin (pts. by wt.) | | 40 | 40 | 40 | 40 | 40 | 40 | 40 |
| (C) γ-aminopropyltriethoxysilane (pts. by wt.) | | 2.0 | 2.0 | 2.0 | 2.0 | 2.0 | 2.0 | 2.0 |
| (D) water (in mole per one mole of (C)) | | — | 0.05 | 0.5 | 1 | 3 | — | 3 |
| (E) glass fiber (pts. by wt) | | — | — | — | — | — | 67 | 67 |
| Physical properties of compositions | | | | | | | | |
| tensile strength (kgf/cm$^2$) | | 845 | 852 | 852 | 851 | 848 | 2340 | 2345 |
| tensile elongation | mean | 48 | 52 | 52 | 54 | 56 | 5.7 | 6.3 |
| (%) | maximum | 57 | 58 | 58 | 59 | 61 | 6.4 | 6.7 |
| | minimum | 21 | 46 | 46 | 50 | 52 | 3.6 | 5.9 |
| Izod impact strength notched | mean | 5.0 | 5.3 | 5.3 | 5.5 | 5.6 | 12.4 | 13.0 |
| (kgcm/cm) | maximum | 5.7 | 5.8 | 5.7 | 5.8 | 6.1 | 13.9 | 13.5 |
| | minimum | 2.7 | 4.8 | 4.9 | 5.0 | 5.2 | 7.8 | 12.7 |
| Izod impact strength unnotched | mean | 80 | 85 | 85 | 86 | 88 | 52 | 59 |
| (kgcm/cm) | maximum | 94 | 95 | 88 | 90 | 92 | 59 | 63 |
| | minimum | 37 | 77 | 81 | 81 | 83 | 34 | 55 |
| thermal deformation temperature [°C.], 18.6 kg load | | 108 | 108 | 108 | 108 | 107 | 254 | 254 |

TABLE 4

| | Comp. Ex. 8 | Ex. 12 | Comp. Ex. 9 | Ex. 13 | Comp. Ex. 10 | Ex. 14 | Comp. Ex. 11 | Ex. 15 |
|---|---|---|---|---|---|---|---|---|
| Blend ratio | | | | | | | | |
| (A) polyphenylene sulfide resin (pts. by wt.) | 60 | 60 | 60 | 60 | 60 | 60 | 60 | 60 |
| (B) nylon 6 resin (pts. by wt.) | 40 | 40 | — | — | 40 | 40 | — | — |
| nylon 12 resin (pts. by wt.) | — | — | 40 | 40 | — | — | 40 | 40 |
| (C) γ-aminopropyltriethoxysilane (pts. by wt.) | 2 | 2 | 2 | 2 | 2 | 2 | 2 | 2 |

TABLE 4-continued

|  |  | Comp. Ex. 8 | Ex. 12 | Comp. Ex. 9 | Ex. 13 | Comp. Ex. 10 | Ex. 14 | Comp. Ex. 11 | Ex. 15 |
|---|---|---|---|---|---|---|---|---|---|
| (D) water (in mole per one mole of (C)) | | — | 0.05 | — | 0.05 | — | 0.05 | — | 0.05 |
| (E) glass fiber (pts. by wt) | | — | — | — | — | 67 | 67 | 67 | 67 |
| Physical properties of compositions | | | | | | | | | |
| tensile strength (kgf/cm$^2$) | | 825 | 834 | 705 | 710 | 2100 | 2120 | 2000 | 2000 |
| tensile elongation (%) | mean | 60 | 64 | 45 | 50 | 8.7 | 9.2 | 7.3 | 7.8 |
| | maximum | 69 | 70 | 56 | 58 | 9.4 | 9.8 | 8.5 | 8.7 |
| | minimum | 35 | 56 | 20 | 44 | 5.6 | 8.5 | 3.6 | 7.0 |
| Izod impact strength notched (kgcm/cm) | mean | 7.2 | 7.6 | 5.1 | 5.5 | 13.2 | 13.6 | 12.0 | 12.5 |
| | maximum | 8.0 | 8.3 | 5.9 | 6.1 | 14.5 | 14.7 | 13.3 | 13.5 |
| | minimum | 3.9 | 7.0 | 2.8 | 5.0 | 8.9 | 12.4 | 7.9 | 11.6 |
| Izod impact strength unnotched (kgcm/cm) | mean | 98 | 110 | 70 | 76 | 65 | 69 | 51 | 56 |
| | maximum | 113 | 121 | 83 | 85 | 73 | 75 | 59 | 61 |
| | minimum | 51 | 101 | 40 | 66 | 46 | 61 | 35 | 47 |
| thermal deformation temperature [°C], 18.6 kg load | | 107 | 107 | 80 | 80 | 247 | 247 | 236 | 236 |

TABLE 5

|  |  | Comp. Ex. 12 | Ex. 16 | Comp. Ex. 13 | Ex. 17 | Comp. Ex. 14 | Ex. 18 | Comp. Ex. 15 | Ex. 19 |
|---|---|---|---|---|---|---|---|---|---|
| Blend ratio | | | | | | | | | |
| (A) polyphenylene sulfide resin (pts. by wt.) | | 60 | 60 | 60 | 60 | 60 | 60 | 60 | 60 |
| (B) nylon 66 resin (pts. by wt.) | | 40 | 40 | 40 | 40 | 40 | 40 | 40 | 40 |
| (C) γ-glycidoxypropyltrimethoxysilane (pts. by wt.) | | 2 | 2 | — | — | — | — | — | — |
| γ-mercaptopropyltrimethoxysilane (pts. by wt.) | | — | — | 2 | 2 | — | — | — | — |
| vinyltrimethoxysilane (pts. by wt.) | | — | — | — | — | 2 | 2 | — | — |
| γ-diallylaminopropyltrimethoxy silane (pts. by wt.) | | — | — | — | — | — | — | 2 | 2 |
| (D) water (in mole per one mole of (C)) | | — | 0.05 | — | 0.05 | — | 0.05 | — | 0.05 |
| (E) glass fiber (pts. by wt) | | — | — | — | — | — | — | — | — |
| Physical properties of compositions | | | | | | | | | |
| tensile strength (kgf/cm$^2$) | | 865 | 875 | 810 | 820 | 825 | 835 | 840 | 845 |
| tensile elongation (%) | mean | 54 | 58 | 42 | 45 | 46 | 49 | 47 | 50 |
| | maximum | 61 | 64 | 49 | 51 | 54 | 55 | 55 | 57 |
| | minimum | 30 | 52 | 22 | 38 | 27 | 41 | 29 | 44 |
| Izod impact strength notched (kgcm/cm) | mean | 6.0 | 6.3 | 4.5 | 4.8 | 4.8 | 5.2 | 4.9 | 5.2 |
| | maximum | 6.8 | 7.2 | 5.3 | 5.4 | 5.7 | 5.8 | 5.8 | 5.8 |
| | minimum | 3.5 | 5.5 | 2.5 | 4.0 | 2.9 | 4.5 | 3.1 | 4.4 |
| Izod impact strength unnotched (kgcm/cm) | mean | 95 | 100 | 70 | 74 | 75 | 79 | 78 | 82 |
| | maximum | 112 | 114 | 83 | 85 | 88 | 94 | 89 | 98 |
| | minimum | 46 | 88 | 38 | 66 | 43 | 68 | 44 | 70 |
| thermal deformation temperature [°C], 18.6 kg load | | 107 | 107 | 109 | 109 | 108 | 108 | 108 | 108 |

TABLE 6

|  |  | Comp. Ex. 2 | Ex. 20 | Ex. 21 | Ex. 22 | Ex. 23 |
|---|---|---|---|---|---|---|
| Blend ratio | | | | | | |
| (A) polyphenylene sulfide resin (parts by wt.) | | 60 | 60 | 60 | 60 | 60 |
| (B) nylon 66 resin (pts. by wt.) | | 40 | 40 | 40 | 40 | 40 |
| (C) γ-aminopropyltriethoxysilane (pts. by wt.) | | 2 | 2 | 2 | 2 | 2 |
| (D) benzylalcohol (in mole per one mole of (C)) | | — | 1.0 | — | — | — |
| ethylene glycol (in mole per one mole of (C)) | | — | — | 1.0 | — | — |
| butanediol (in mole to one mole of (C)) | | — | — | — | 1.0 | — |
| glycerine (in mole per one mole of (C)) | | — | — | — | — | 1.0 |
| (E) glass fiber (pts. by wt) | | — | — | — | — | — |
| Physical properties of compositions | | | | | | |
| tensile strength (kgf/cm$^2$) | | 845 | 850 | 853 | 853 | 854 |
| tensile elongation (%) | mean | 48 | 51 | 53 | 52 | 54 |
| | maximum | 57 | 57 | 59 | 60 | 59 |
| | minimum | 21 | 40 | 48 | 47 | 50 |
| Izod impact strength notched (kgcm/cm) | mean | 5.0 | 5.1 | 5.4 | 5.4 | 5.6 |
| | maximum | 5.7 | 5.6 | 5.8 | 5.9 | 6.0 |
| | minimum | 2.7 | 4.1 | 4.8 | 4.9 | 5.1 |
| Izod impact strength unnotched (kgcm/cm) | mean | 80 | 83 | 85 | 85 | 86 |
| | maximum | 94 | 94 | 96 | 97 | 100 |
| | minimum | 37 | 60 | 78 | 77 | 80 |

TABLE 6-continued

|  | Comp. Ex. 2 | Ex. 20 | Ex. 21 | Ex. 22 | Ex. 23 |
|---|---|---|---|---|---|
| thermal deformation temperature [°C.], 18.6 kg load | 108 | 108 | 108 | 108 | 108 |

TABLE 7

|  |  | Comp. Ex. 2 | Ex. 24 | Ex. 25 | Ex. 3 |
|---|---|---|---|---|---|
| Blend ratio | | | | | |
| (A) polyphenylene sulfide resin (parts by weight) | | 60 | 60 | 60 | 60 |
| (B) nylon 66 resin (pts. by wt.) | | 40 | 40 | 40 | 40 |
| (C) γ-aminopropyltriethoxysilane (pts. by wt.) | | 2 | 2 | 2 | 2 |
| (D) water added to (A) (in mole per one mole of (C)) | | — | 0.5 | — | — |
| water added to (B) (in mole per one mole of (C)) | | — | — | 0.5 | — |
| water added to (C) (in mole per one mole of (C)) | | — | — | — | 0.5 |
| (E) glass fiber (pts. by wt) | | — | — | — | — |
| Physical properties of compositions | | | | | |
| tensile strength (kgf/cm$^2$) | | 845 | 851 | 852 | 852 |
| tensile elongation (%) | mean | 48 | 50 | 51 | 52 |
|  | maximum | 57 | 57 | 59 | 58 |
|  | minimum | 21 | 40 | 45 | 46 |
| Izod impact strength notched (kgcm/cm) | mean | 5.0 | 5.2 | 5.3 | 5.3 |
|  | maximum | 5.7 | 5.8 | 5.7 | 5.7 |
|  | minimum | 2.7 | 4.1 | 4.7 | 4.9 |
| Izod impact strength unnotched (kgcm/cm) | mean | 80 | 85 | 84 | 85 |
|  | maximum | 94 | 91 | 90 | 88 |
|  | minimum | 37 | 74 | 80 | 81 |
| thermal deformation temperature [°C.], 18.6 kg load | | 108 | 108 | 108 | 108 |

We claim:

1. A method of preparing a polyarylene sulfide resin composition, comprising; forming a mixture of the following components:
    (A) 97 to 20 parts by weight of a polyarylene sulfide resin and
    (B) 3 to 80 parts by weight of a polyamide resin, with
    (C) 0.01 to 5 parts by weight of at least one silane compound selected from the group consisting of vinylalkoxysilane, epoxyalkoxysilane, aminoalkoxysilane, mercaptoalkoxysilane and allylalkoxysilane, and
    (D) 0.03 to 5 moles per mole of said silane compound (C) of water or at least one alcohol having a boiling point of 100° C. or more, and heat melting and kneading said mixture for 30 seconds or more.

2. The method of claim 1 wherein said component (D) is said at least one alcohol each having at least two hydroxyl groups.

3. The method of claim 1 wherein said polyarylene sulfide resin (A) comprises polyphenylene sulfide.

4. The method of claim 3 wherein said polyphenylene sulfide comprises a homopolymer composed of p-phenylene sulfide groups.

5. The method of claim 3 wherein said polyphenylene sulfide comprises a copolymer composed p-phenylene sulfide groups and m-phenylene sulfide groups.

6. The method of claim 5 wherein said copolymer comprises 5 to 40 mole % of said m-phenylene sulfide groups and 60 to 95 mole % of said p-phenylene sulfide groups.

7. The method of claim 1 wherein said polyamide resin (B) is selected from nylon 6, nylon 66, nylon 12 and copolymers thereof.

8. The method of claim 1 wherein said component (D) is water.

9. The method of claim 1 wherein said mixture is formed by mixing component (D) with said one silane compound (C) and adding the mixture of (C) and (D) to a mixture of said polyarylene sulfide resin (A) and said polyamide resin (B) prior to said heat melting and kneading.

10. The method of claim 1 wherein said mixture is formed by mixing said component (D) with said polyarylene sulfide resin (A), said polyamide resin (B) or a mixture of (A) and (B) prior to mixing with said component (C).

11. The method of claim 10 wherein said component (D) is water.

12. The method of claim 5 further mixing (E) 1 to 400 parts by weight of at least one filler with said mixture.

13. The method of claim 12 wherein said filler (E) comprises a fibrous, powdery or flaky filler.

14. The method of claim 13 wherein said filler comprises glass or carbon fiber.

15. The method of claim 13 wherein said filler comprises a mixture of a fibrous filler with a powdery or flaky filler.

16. A polyarylene sulfide resin composition prepared by the method of claims 1 or 2.

17. The polyarylene sulfide resin composition of claim 16 further including 1 to 400 parts by weight of a filler (E).

18. The polyarylene sulfide resin composition of claim 17 wherein said filler comprises a fibrous, powdery or flaky filler.

19. The polyarylene sulfide resin composition of claim 17 wherein said filler (E) comprises glass or carbon fiber.

20. The polyarylene sulfide resin composition of claim 16 wherein said polyarylene sulfide is selected from a homopolymer composed of p-phenylene sulfide units or a copolymer composed of a mixture of p-phenylene sulfide units and m-phenylene sulfide units.

* * * * *